(12) United States Patent
Kobayashi

(10) Patent No.: US 8,415,649 B2
(45) Date of Patent: Apr. 9, 2013

(54) RADIATION IMAGING APPARATUS

(75) Inventor: Masaaki Kobayashi, Shimotsuke (JP)

(73) Assignee: Canon Kabushiki Kaisha, Tokyo (JP)

(*) Notice: Subject to any disclaimer, the term of this patent is extended or adjusted under 35 U.S.C. 154(b) by 289 days.

(21) Appl. No.: 12/861,901

(22) Filed: Aug. 24, 2010

(65) Prior Publication Data

US 2011/0049371 A1    Mar. 3, 2011

(30) Foreign Application Priority Data

Aug. 31, 2009   (JP) .................................. 2009-201092

(51) Int. Cl.
  *G01N 23/04*   (2006.01)
(52) U.S. Cl. .......................................................... 250/581
(58) Field of Classification Search .................... 250/581
  See application file for complete search history.

(56) References Cited

U.S. PATENT DOCUMENTS 6,965,111 B2 *   11/2005   Endo ........................ 250/370.11

FOREIGN PATENT DOCUMENTS

| JP | 2002-040144 | 2/2002 |
| JP | 2007-163216 | 6/2007 |

* cited by examiner

*Primary Examiner* — David Porta
*Assistant Examiner* — Hugh H Maupin
(74) *Attorney, Agent, or Firm* — Fitzpatrick, Cella, Harper & Scinto

(57) ABSTRACT

A radiation imaging apparatus comprises a housing having an upper panel on the incident side of radiation, a bottom panel opposite to the upper panel, a side panel connecting the upper panel with the bottom panel. The housing accommodates a radiation detection panel, a light source and a chassis providing rigidity to the housing. The chassis has a transmissible part which transmit the calibration light from the light source, the radiation detection panel is fixed on the side of the upper panel, and the light source is fixed on the side of the bottom part of the chassis. Further, a detachable lid is formed in at least a part of the bottom panel, and the opening portion is formed so as to expose the light source.

11 Claims, 3 Drawing Sheets

RADIATION IMAGING APPARATUS

BACKGROUND OF THE INVENTION

1. Field of the Invention

The present invention relates to a radiation imaging apparatus that uses a radiation detection panel of converting radiation ray to an electronic signal corresponding to the intensity of the radiation ray.

2. Description of the Related Art

A digital radiation imaging apparatus has been recently realized, where it directly digitalizes a radiation image by using so called a flat panel detector (FPD), a radiation detection panel, which is formed by closely contacting a phosphor and a solid-state image sensor having a large emitting area. Most analog radiation imaging apparatus on the market has been replaced by digital radiation imaging apparatus, which have been broadly used on the market. By using the digital radiation imaging apparatus equipped with the FPD, digital information can be instantly obtained from the radiation image, which reduces the workload related to image capture for operators and increases the efficiency of interpretation by medical doctors among many other advantages. Owing to technical progress, the digital radiation imaging apparatus is miniaturized to the size of a conventional analog cassette, and a portable digital radiation imaging apparatus, so called an electronic cassette, has been developed. The electronic cassette is superior to portability as well as the conventional analog cassette, and it has advantage such that it can be used for multipurpose by taking it along in a hospital ward.

In cases of portable image capture, because the weight of the subject to be imaged is often placed upon the image capture apparatus case, the image capture apparatus requires a high-strength structure in order to protect the radiation detection panel within it, which is made of thin, brittle glass, from the weight. Thus, the electronic cassette is desirable to have large rigidness and light weight.

On the other hand, the radiation detection panel has characteristic change by long usage and property of inducing low S/N ratio by a dark current. Japanese Patent Laid-Open No. 2002-040144 has proposed the apparatus having a light source to irradiate light for calibration of each element of the radiation detection panel. In this patent Laid-Open discloses a LED, an EL (Electronic Luminescence), a cold-cathode tube and a semi-conductor tube as such light source.

Japanese Patent Laid-Open No. 2007-163216 shows a configuration of placing a light source composed of a cold-cathode tube and a light guide panel on the low side of the radiation detection panel. Further, support members for the light source are placed on the low side of the radiation detection panel and the light source.

Because a light source of electronic cassette is desirable to be a light source without a light guide panel which stands in the way of the thinness and light weight, an EL light source is well suited to the light source, which is thin and lightweight and a planar emitter. On the other hand, generally speaking, a light emission amount of a light source including an EL light source, will have degradation if it is used for a long time. In medical field, a long durable years period for usage is desired comparing to that of general commercial products. For this reason, the exchangeability to parts having a short life is desired. Further, in actual medical site, immediate correspondence to a sudden failure of apparatus, and recovery of the apparatus are required.

Thus, a light source which has a life shorter than a life of radiation detection panel is desired to be exchangeable. However, in the prior art, it was difficult to exchange a light source because it needs to be placed between the radiation detection panel and the support structure of the radiation detection panel. Further, regarding the exchange work, the structure did not consider the workability.

SUMMARY OF THE INVENTION

One aspect of the present invention provides a radiation imaging apparatus which makes easier to exchange a light source for calibration of a radiation detection panel, and which realizes a lightweight mounting configuration required for a portable image capturing.

According to one aspect of the present invention, there is provided a radiation imaging apparatus comprising: a housing having an upper panel on the incident side of radiation, a bottom panel opposite to the upper panel, a side panel connecting the upper panel with the bottom panel; a radiation detection panel accommodated in the housing, having a conversion element which generates electrical signals corresponding to the incident radiation dose; a light source in panel fashion, accommodated in the housing, for generating calibration light for the conversion elements; and a chassis fixed on the housing, for providing rigidity to the housing, wherein the chassis has a transmissible part which transmit the calibration light from the light source, the radiation detection panel is fixed on the side of the upper panel, and the light source is fixed on the side of the bottom part of the chassis, and a detachable lid is formed at least at a part of the bottom panel, and an opening portion for exposing the light source is formed by detaching the detachable lid.

According to another aspect of the present invention, there is provided a radiation imaging apparatus, comprising: a housing having an upper panel on the incident side of radiation, a bottom panel opposite to the upper panel, a side panel connecting the upper panel with the bottom panel; a radiation detection panel accommodated in the housing, having a conversion element which generates electrical signals corresponding to the incident radiation dose; a light source in panel fashion, accommodated in the housing, for generating calibration light for the transducer; and a diffusion board for converting the calibration light generated in the light source to a light in plate fashion, and a chassis fixed on the housing, for providing rigidity to the housing, wherein the radiation detection panel is fixed by pinching the diffusion board with the chassis on the side of the upper panel of the chassis, the light source is fixed on a plane opposite to the side panel of the chassis, and the chassis has a light guide path for guiding the calibration light to the diffusion board, and a detachable lid is formed in at least a part of the bottom panel, and an opening portion is formed so as to expose the light source.

Furthermore, according to another aspect of the present invention, there is provided a radiation imaging apparatus comprising: a housing having an upper panel on the incident side of radiation, a bottom panel opposite to the upper panel, a side panel connecting the upper panel with the bottom panel; a phosphor layer accommodated in the housing, emitting light corresponding to incident radiation dose; a radiation detection panel having a sensor layer comprising a plurality of conversion element to convert the light from the phosphor layer; a light source in panel fashion, accommodated in the housing, for generating calibration light for the conversion elements; a chassis fixed in the housing, for providing rigidity to the housing, wherein the radiation detection panel is fixed by heading the sensor layer to an incident side of the radiation on the side of the upper panel of the chassis, and the light source is fixed on the side of the upper panel of the radiation detection panel, and a detachable lid is formed in at least a part of the bottom panel, and the light source is exposed so as to easily accessed by a user by detaching the lid.

Still further, according to another aspect of the present invention, there is provided a radiation imaging apparatus comprising: a housing having an upper panel on the incident side of radiation, a bottom panel opposite to the upper panel, a side panel connecting the upper panel with the bottom panel; a radiation detection panel accommodated in the housing, having a transducer which generates electrical signals in accordance with the incident radiation dose; a light source in panel fashion, accommodated in the housing, for generating calibration light for the transducer; and a chassis fixed in the housing, for providing rigidity to the housing, wherein the light source is fixed so that an emitting plane of the light source faces to the upper panel, and a detachable lid is formed in at least a part of the upper panel, and the radiation detection panel is fixed inside the lid, and the opening portion is formed so as to expose the light source by detaching the lid.

Further features of the present invention will become apparent from the following description of exemplary embodiments with reference to the attached drawings.

DESCRIPTION OF THE EMBODIMENTS

<First Embodiment>

Figure 1:
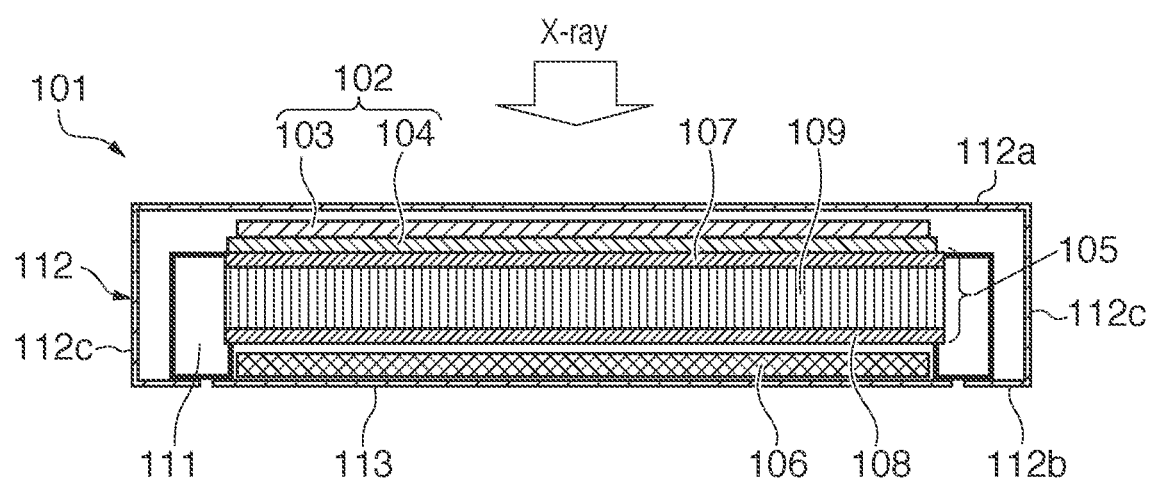
FIG. 1 shows the arrangement of radiation imaging apparatus in the first embodiment.

FIG. 1 illustrates an example of an arrangement of portable radiation imaging apparatus in the first embodiment. As shown in FIG. 1, in the portable radiation imaging apparatus 101, a housing 112 comprises a top panel 112a, a bottom panel 112b facing the top panel 112a, and a side panel 112c for connecting the top panel 112a with the bottom panel 112b. A housing 112 internally accommodates a radiation detection panel 102, a chassis 105 and a light source 106 in panel fashion. The radiation detection panel 102 has a conversion element of generating an electrical signal corresponding to incident radiation dose. In this embodiment, the radiation detection panel 102 comprises a phosphor layer 103 for converting an incident X-ray to light, and a sensor layer 104 which is populated in glass fashion with multiple photoelectric conversion elements and switch elements for converting the emission of the phosphor layer 103 to an electrical signal. Therefore, the conversion element comprises the phosphor and the photoelectric transducer. Two layers, the phosphor layer 103 and the sensor layer 104 are united with an adhesive means and so on. In addition, an element of directly converting from a X-ray dose to an electric signal may be utilized as a conversion element. In this case, the phosphor layer 103 can be omitted.

The chassis 105 which is a structure of supporting the radiation detection panel 102, provides a rigidness to the housing 112. The radiation detection panel 102 is fixed on the chassis 105 so as to positioning the phosphor layer 103 to the side of incident X-ray. Further, the light source 106 has a shape in panel fashion and generates a light for calibration to irradiate to the sensor layer 104 of the radiation detection panel 102. The light source 106 is preferable to be light source like a lightweight EL sheet having the thickness of 0.4 mm so as to be accommodated in the portable radiation imaging apparatus 101. The light source 106 in sheet fashion is placed on the back side of the fixed surface of the radiation detection panel 102, and its emission surface is placed so as to head for the chassis 105.

The chassis 105 has a function of structure to protect the radiation detection panel 102 from the load pressed from the upper side of the radiation imaging apparatus 101 and an optical function of transmitting the light generated from the light source 106 to the conversion elements of the radiation detection panel 102. As shown in FIG. 1, the chassis 105 comprises two thin boards, the top reinforcing board 107 and the bottom reinforcing board 108, and a core material 109 pinched between these boards, and has a transmission part providing the optical function as described above.

Figure 2A:
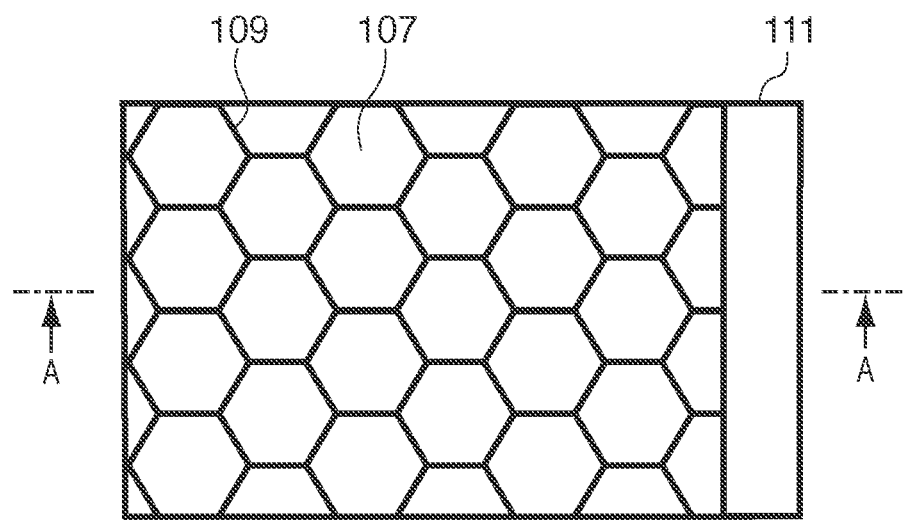
FIGS. 2A and 2B show an explanatory drawing of chassis portion in the first embodiment.

FIG. 2A shows the chassis 105 in view from the direction of incident X-ray. Because the top reinforcing board 107 is composed of an optically transparent material, the figure indicates that the core material 109 is transparent. The core material 109 has a honeycomb structure by leaving with no space between partitions in hexagon fashion. Aluminum foil having the thickness of about 25 to 50 μm is used for making the partitions, and spaces surrounded with the partitions are composed of air layers. The weight of chassis 105 can be drastically reduced because most part of the content of the core material 19 becomes air layers by using the honeycomb structure. In addition, the shape of the partition is indicated as the hexagon in FIG. 2A. However, other shape like lattice and so on may be utilized if the rigidness is enough. In the present embodiment, it is assumed that the honeycomb structure may include partition shapes other than hexagon including, for example, a square.

Figure 2B:
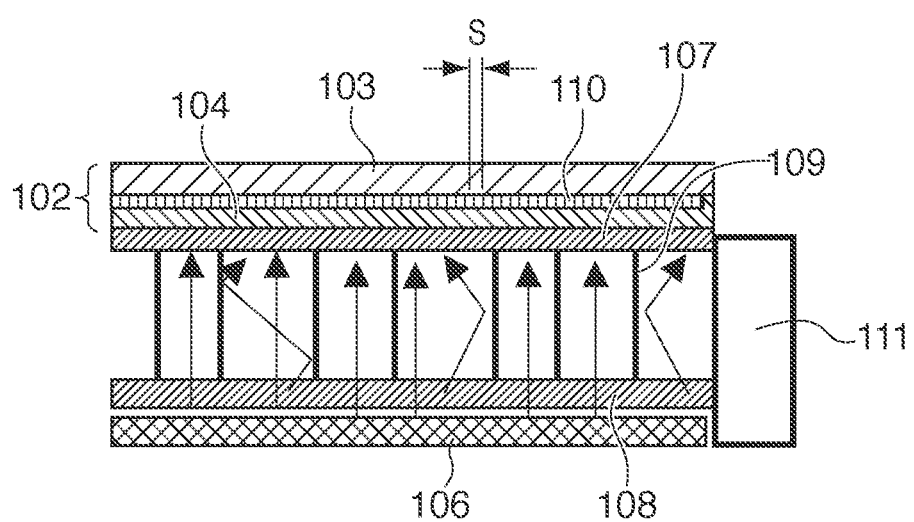

FIG. 2B shows a cross section of a portion indicated with the dashed line in FIG. 2A. In this regard, both the radiation detection panel 102 and the light source 106 are illustrated in FIG. 2B because they are described next. For example, the top reinforcing board 107 and the bottom reinforcing board 108 are composed of a plastic member having optically high transparency, for example, polycarbonate plastic, math acrylic plastic and so on, and fixed on the top and bottom side of the core material 109 with the adhesive means and others. In this configuration, the chassis 105 forms a sandwich structure and provides a lightweight and strong reinforcing structure, and further supports the radiation detection panel 102.

The light source 106 placed on the lower side of the chassis 105 emits at appropriate timing before and after capturing the subject. The EL sheet-like light source is used as the light source 106, thereby obtaining uniform emission in whole area and it can be placed even in a small gap. Further, the light source in panel fashion may be configured by arranging in a plane a plurality of small light emitters such as LEDs and others, which are recently significantly improved.

A light emitted from the light source 106 is transmitted to the bottom reinforcing board 108 and impinged on the core material 109. Because the core material 109 is comprised of metal material through which the light cannot transmit, and has a honeycomb structure, a cross section of the core material shows that most part of the material occupies air layers. For example, the ratio of occupying the air layers in the cross section is 96% in the honeycomb structure, which is configured by the partition of the hexagon having a diagonal length, 7 mm and a foil thickness, 50 μm. Therefore, the light can be transmitted almost with no loss to the upper side (toward the radiation detection panel 102). Further, even if the light source, whose light is spread like a LED source, is used, the efficiency of light usage can be improved by using material with high reflectance like aluminum and others as the core material 109. The light transmits to the top reinforcing board 107 of the upper side of the core material 109, and reaches the back plane of the radiation detection panel 102. A plurality of conversion element 110 is formed on the sensor layer 104 in a two-dimensional plane. The pixel size of the conversion element (the dimension, "S" in FIG. 2B) is normally 100 to 200 µm, which is larger than the foil thickness, 25 to 50 µm. Therefore, whole elements of the conversion element 110 are never concealed by any positioning relationship between the partition of the core material 109 and each element of the conversion elements 110. Of course, the elements and the partition may be implemented by precisely adjusting the positioning relationship between each element and the partition. In this case, the cross section shape of the partition becomes a shape like a lattice.

If the light further needs to uniformly irradiate each element, a diffusion board having improved diffusivity may be used for the top reinforcing board 107 to provide uniform irradiation. On the contrary, it is possible to precisely control the irradiation amount to each element. This is effective if the property of the radiation detection panel shows some change in some distribution. In this case, the uniform irradiation is realized by using the plurality of LEDs as the light source and controlling the emission amount of LEDs per a predetermined region of the honeycomb structure.

The chassis 105 is fixed on an inner wall of the housing 112 which is an exterior of the radiation imaging apparatus 101 via a fastening part 111 set around the chassis. An access lid 113 as a lid material is placed so as to be detachable in the bottom panel 112b of the housing 112. The inner structure is in sealed condition and protected when the access lid 113 is closed. The opening portion, which is accessible to an interior portion of the bottom plane of the housing 112, is formed by separating the access lid 113 apart from the housing 112. In addition, as it will be described in second and third embodiments, the housing 112 may be configured with a top housing (which is comprised of the top panel 112a and an upper portion of the side panel 112c) and a bottom housing (which is composed of the bottom panel 112b and a lower portion of the side panel 112c). In this case, detaching the bottom housing can expose the light source 106. In this regard, the chassis 105 needs to be fixed on the top housing. As described above, the arrangement will be provided such that the light source 106 will be easily replaced by forming the opening portion forms the detachable lid portion (access lid 113 or the bottom housing) at least at a part of the bottom panel 112b and so as to expose the light source by detaching the lid portion.

Owing to place the light source 106 on the lower layer in the interior of structure, as mentioned, the light source 106 is exposed in the opening portion that is formed in the housing 112 when the access lid 113 is separated. The light source 106 is glued down on the bottom reinforcing board 108 with adhesive strength so as to be peeled off non-destructively. Alternatively, without the adhesive strength, the structure may be such that the light source 106 is pressed on the bottom reinforcing board 108 by an elastic material mounted on the access lid 113 when the access lid 113 is closed. As described above, the detachable lid (access lid 113) is placed on at least a part of the bottom panel 112b of the housing 112, and detaching this access lid 113 forms the opening portion for exposing the light source 106. A connector for wiring connected to the light source 106 is placed near the light source 106, and a user can easily detach the light source 106 from the opening portion by accessing to the connector from the opening portion and detaching it.

As described above, it is possible to access and further replace the light source from the lower surface of the imaging apparatus in the first embodiment. Further, because a delicate part like the radiation detection panel and others is accommodated in the housing, a worker can safely and rapidly work for the replacement.

In addition, a mounting configuration of the portable radiation imaging apparatus is explained so far, and in order to improve workability, this configuration can be also applied to a stationary type of the imaging apparatus mounted on a stand and so on. In this case, because the requirement for thickness and lightweight is not so significant comparing that of the portable radiation imaging apparatus, the honeycomb structure applied to the chassis in FIG. 1 can be configured with optical transparent material like transparent plastic and others. By configuring with the transparent material as a chassis, the replacement property is enhanced because the light source can be placed on the lowest layer.

Figure 3:
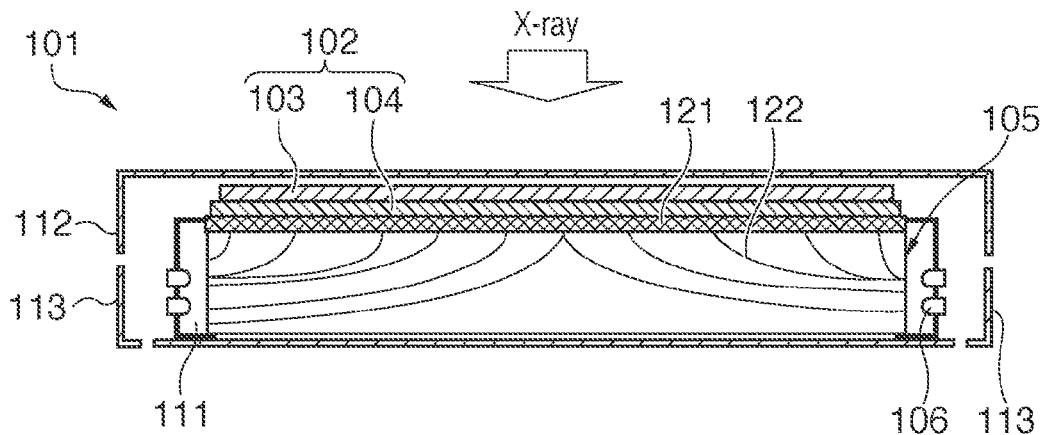
FIG. 3 shows an example of deforming the arrangement of radiation imaging apparatus in the first embodiment.

FIG. 3 shows a modified example of the first embodiment. In FIG. 3, the light source 106 is placed on both side surfaces of the chassis 105. A plurality of small light sources such as LEDs are utilized for the light source 106. Further, a light guiding path 122 which comprises an optical fiber of guiding a light from the light source 106 to a diffusion plate 121 is placed inside the chassis 105. Setting the light path inside the chassis 105, it is possible to use the whole thickness for increasing the strength. This results the thin thickness of the imaging apparatus comparing to a case where a light guiding panel and chassis material and the like are separately placed as individual layers. The configuration allows a use to access and exchange the light source as described above. The access lid 113, which extends from circumference of the bottom to the lateral of the housing, is placed on the housing 112. Further, the opening portion may be formed so as to expose the light source 106 for exchange when the access lid is detached, it will be acceptable that the opening portion is formed on only the side panel 112c. Thus as described above, the detachable lid (the access lid 113), and the opening portion is formed at least at the part of the side panel of the housing 112 so as to expose the light source 106 by detaching the access lid.

<Second Embodiment>

Figure 4:
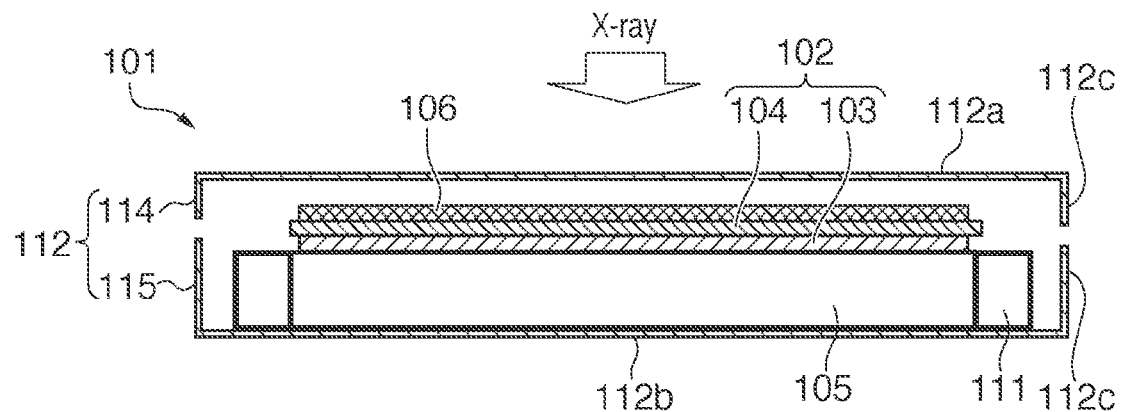
FIG. 4 shows the arrangement of radiation imaging apparatus in the second embodiment.

FIG. 4 shows a structure illustrating a second embodiment. In the first embodiment, by placing, in order from the incident radiation beam: the radiation detection panel 102, the chassis 105 and the light source 106: and by placing the light source 106 at the lowest layer, a configuration is achieved whereby the light source may be easily accessed from the lower surface. On the other hand, in the second embodiment, the light source 106, the radiation detection panel 102 and chassis 105 in the order from the incident side of the radiation ray, are placed, where the light source 106 is configured with the highest layer. By using the above structure, it will be easier to access from the top of the radiation imaging apparatus 101.

In FIG. 4, the same elements as elements in FIG. 1 will be indicated as the same numbers in FIG. 1. As shown in FIG. 4, the radiation detection panel 102 is fixed on the chassis 105 so as to place the phosphor layer 103 under the sensor layer 104. Thus, an X-ray impinged from the top of the radiation imaging apparatus 101 transmits through the sensor layer 104 comprising glasses, and converted to the light by the phosphor layer 103 and the light emission is captured by the sensor layer 104. The arrangement such that the phosphor layer 103 and the sensor layer 104 are placed in reverse is realized because the thin thickness of glasses utilized for the sensor layer 104 has been possible and X-ray attenuation at the glass is reduced owing to the latest progress of semi-conductor technology. The radiation detection panel 102 is mounted on the sensor layer 104 and the phosphor layer 103 in the order, and then the light source 106 is possible to place on the incident side of the X-ray of the radiation detection panel 102. Further, the X-ray is attenuated by the light source 106 at the X-ray capturing because the X-ray transmitted through the light source 106 is impinged upon the detector. However, if a very thin EL sheet is utilized as the light source 106, the attenuation amount will be small and it will be possible to compensate reflection by calibration even if there is the reflection due to the unevenness of the inner structure of the light source 106. The light source 106 is temporally fixed the backside of the sensor layer 104 with the adhesive and the like so as to make the emission surface look down. Further, it should be noted that the light source 106 is attached to the rear surface of the sensor layer 104 by adhesive force that allows it to be non-destructively removed. Using the above arrangement, the light source 106 can be placed on the highest layer and then accessibility to the light source 106 can be improved.

The chassis 105 for supporting the radiation detection panel 102, is connected to the inner wall of the housing 112 as shown in FIG. 1. In this embodiment, although the chassis 105 is not required of specific optical characteristics, it is desired to have the stiffness and lightweight, and the sandwich-structure may be able to apply to the chassis.

It is possible to divide the housing 112 into the upper housing 114 and the lower housing 115. The opening portion is formed toward the upper side in the housing 112 by detaching the upper housing 114. As described above, the light source 106 in the opening portion is exposed because the light source is placed on the highest layer. Based on this configuration, it is easy to access to the light source 106. Further, the light source 106 is temporally fixed on the inner wall of the upper housing 114, and it can be arranged by accompanying with the upper housing 114. Then, it may not be necessary to contact precision parts such as the radiation detection panel and the like when accessing to the light source 106. Further, like the access lid 113 in the first embodiment, the detachable lid material is formed at least as a part of the top panel 112a, and then the opening portion may be configured to be formed in order to expose the light source 106 when the lid material is detached.

As described above, in the second embodiment, a detachable access lid is formed at least as a part of the upper panel (the detachable upper housing 114), and the light source 106 is exposed so as to be treated by the user by detaching the access lid. Therefore, as described in the first embodiment, the user can easily access to the light source 106.

<Third Embodiment>

Figure 5:
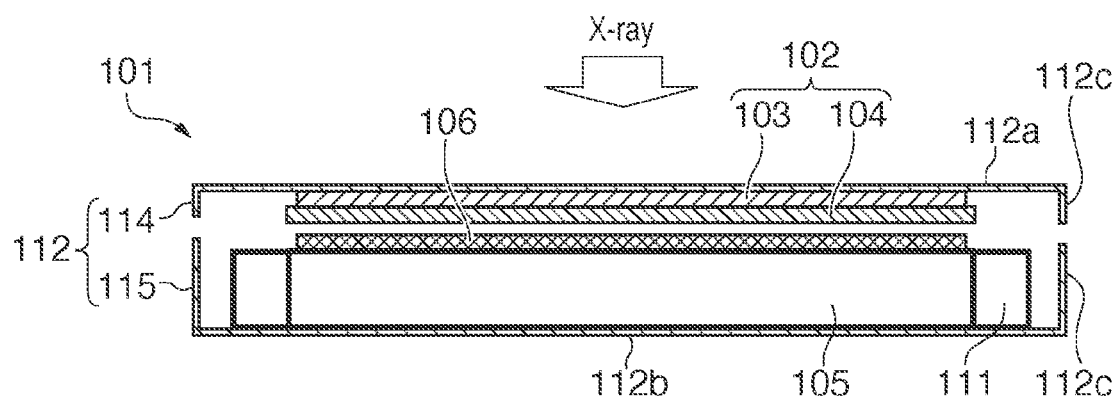
FIG. 5 shows the arrangement of radiation imaging apparatus in the third embodiment.

FIG. 5 shows a structure indicating the third embodiment. In the third embodiment, the radiation detection panel 102, the light source 106 and chassis 105 are placed in the order from the incident side of the X-ray. Further, the connection between the radiation detection panel 102 and the light source 106 is not necessary, and the access to the light source is easy because the light source 106 is exposed when the upper housing 114 is detached.

In FIG. 5, the surface of the phosphor layer 103 of the radiation detection panel 102 is held to the upper housing 114, the upper side of the housing 112 with a fix means such as adhesive and others. In addition, although it is not indicated in figures, the side of the upper housing 114, also holds an electrical circuit connected to the radiation detection panel 102 in order to drive it. On the other hand, the chassis 105 is fixed on the lower housing 115 on the lower side of the housing 112. Further, the light source 106 is placed on the chassis 105. The light source 106 may be fixed on the chassis 105 with temporary fix-strength because it is pinched between the radiation detection panel 102 and the chassis 105 while the upper housing 114 and the lower housing 115 are connected together. Thus, the light source 106 is attached to the backside of the chassis 105 with the adhesive strength such that the light source can be peeled off nondestructively. Further, the light source 106 may be temporarily held on the side of the radiation detection panel 102.

Using the arrangement as described, the light source 106 will be exposed in the opening portion of the housing 112 because the radiation detection panel 102 is detached with the upper housing 114 when the upper housing is detached. In this configuration, the user can easily access to the light source 106. Further, as the access lid 113 in the first embodiment, by forming a detachable lid as a part of the top panel 112a, an opening portion may be formed so as to expose the light source 106 when the lid is detached.

As described above, in the third embodiment, a detachable lid (upper housing 114) at least as a part of the upper panel of the housing 112 is formed, thereby fixing the radiation detection panel 102 on the inner surface of the lid. Further, the opening portion is configured to form so as to expose the light source 106 when the lid is detached. For this reason, the user can easily access to the light source 106 because of the arrangement such that the light source 106 is exposed when the upper housing 114 is detached.

The present invention provides a radiation imaging apparatus which makes replacement of a light source easy, provides a long and stable image in medical field required of long usage, and enables thin and light weight mounting which is required in a portable capturing. Further, the light source is exposed in the condition of easy exchange-work, and a worker can work at ease in a short time without touching things around a fragile radiation detection panel, and can quickly respond to a failure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-201092, filed Aug. 31, 2009, which is hereby incorporated by reference herein in its entirety.

What is claimed is:

1. A radiation imaging apparatus comprising:
    a housing having an upper panel on the incident side of radiation, a bottom panel opposite to the upper panel, a side panel connecting the upper panel with the bottom panel;
    a radiation detection panel accommodated in the housing, having one or more conversion elements which generate electrical signals corresponding to the incident radiation dose;
    a light source in panel fashion, accommodated in the housing, for generating calibration light for the conversion elements; and
    a chassis fixed on the housing, for providing rigidity to the housing,
    wherein the chassis has a transmissible part which comprises a honeycomb structure formed with metal core material and transmits the calibration light from the light source, the radiation detection panel is fixed on the side of the upper panel, and the light source is fixed on the side of the bottom part of the chassis, and a detachable lid is formed at least at a part of the bottom panel, and an opening portion for exposing the light source is formed by detaching the detachable lid.

2. The apparatus according to claim 1, wherein transmissible part has a structure such that the honeycomb structure is pinched between two optically transparent boards.

3. The apparatus according to claim 1, wherein in the transmissible part optical transparent boards are provided on the side of the light source, and diffusion boards are provided on the side of the radiation detection panel having the honeycomb structure.

4. The apparatus according to claim 1, wherein the thickness of the core material is smaller than the size of at least one conversion element.

5. A radiation imaging apparatus, comprising:
a housing having an upper panel on the incident side of radiation, a bottom panel opposite to the upper panel, a side panel connecting the upper panel with the bottom panel;
a radiation detection panel accommodated in the housing, having a conversion element which generates electrical signals corresponding to the incident radiation dose;
a light source in panel fashion, accommodated in the housing, for generating calibration light for the transducer; and
a diffusion board for converting the calibration light generated in the light source to a light in plate fashion, and
a chassis fixed on the housing, for providing rigidity to the housing,
wherein the radiation detection panel is fixed by pinching the diffusion board with the chassis on the side of the upper panel of the chassis, the light source is fixed on a plane opposite to the side panel of the chassis, and the chassis has a light guide path for guiding the calibration light to the diffusion board, and
a detachable lid is formed in at least a part of the bottom panel, and an opening portion is formed so as to expose the light source.

6. A radiation imaging apparatus comprising:
a housing having an upper panel on the incident side of radiation, a bottom panel opposite to the upper panel, a side panel connecting the upper panel with the bottom panel;
a phosphor layer accommodated in the housing, emitting light corresponding to incident radiation dose;
a radiation detection panel having a sensor layer comprising a plurality of conversion elements to convert the light from the phosphor layer;
a light source in panel fashion, accommodated in the housing, for generating calibration light for the conversion elements;
a chassis fixed in the housing, for providing rigidity to the housing,
wherein the radiation detection panel is fixed by heading the sensor layer to an incident side of the radiation on the side of the upper panel of the chassis, and the light source is fixed on the side of the upper panel of the radiation detection panel, and
a detachable lid is formed in at least a part of the bottom panel, and the light source is exposed so as to easily accessed by a user by detaching the lid.

7. The apparatus according to claim 6, wherein the light source is fixed on the side of the upper panel of the radiation detection panel, an opening portion is formed so as to expose the light source by detaching the lid.

8. The apparatus according to claim 6, wherein
the light source is fixed on the inside of the lid in the chassis.

9. A radiation imaging apparatus comprising:
a housing having an upper panel on the incident side of radiation, a bottom panel opposite to the upper panel, a side panel connecting the upper panel with the bottom panel;
a radiation detection panel accommodated in the housing, having a transducer which generates electrical signals in accordance with the incident radiation dose;
a light source in panel fashion, accommodated in the housing, for generating calibration light for the transducer; and
a chassis fixed in the housing, for providing rigidity to the housing,
wherein the light source is fixed so that an emitting plane of the light source faces to the upper panel, and
a detachable lid is formed in at least a part of the upper panel, and the radiation detection panel is fixed inside the lid, and the opening portion is formed so as to expose the light source by detaching the lid.

10. A radiation imaging apparatus, comprising:
a housing having an upper panel on the incident side of radiation, a bottom panel opposite to the upper panel, a side panel connecting the upper panel with the bottom panel;
a radiation detection panel accommodated in the housing, having a conversion element which generates electrical signals corresponding to the incident radiation dose;
a light source in panel fashion, accommodated in the housing, for generating calibration light for the transducer; and
a diffusion board for converting the calibration light generated in the light source to a light in plate fashion, and
a chassis fixed on the housing, for providing rigidity to the housing,
wherein the radiation detection panel is fixed by pinching the diffusion board with the chassis on the side of the upper panel of the chassis, the light source is fixed on a plane opposite to the side panel of the chassis, and the chassis has a light guide path for guiding the calibration light to the diffusion board, and
a detachable lid is formed in at least a part of the side panel, and an opening portion is formed so as to expose the light source.

11. A radiation imaging apparatus comprising:
a housing having an upper panel on the incident side of radiation, a bottom panel opposite to the upper panel, a side panel connecting the upper panel with the bottom panel;
a phosphor layer accommodated in the housing, emitting light corresponding to incident radiation dose;
a radiation detection panel having a sensor layer comprising a plurality of conversion elements to convert the light from the phosphor layer;
a light source in panel fashion, accommodated in the housing, for generating calibration light for the conversion elements;
a chassis fixed in the housing, for providing rigidity to the housing,
wherein the radiation detection panel is fixed by heading the sensor layer to an incident side of the radiation on the side of the upper panel of the chassis, and the light source is fixed on the side of the upper panel of the radiation detection panel, and a detachable lid is formed in at least a part of the upper panel, and the light source is exposed so as to easily accessed by a user by detaching the lid.

* * * * *